(12) United States Patent
Neter et al.

(10) Patent No.: US 8,002,540 B2
(45) Date of Patent: Aug. 23, 2011

(54) NECK BLOCK COOLING

(75) Inventors: Witold Neter, Newnan, GA (US);
Marek Hoenisch, Huenstetten (DE);
Klaus Wegmann, Ingelheim (DE);
Stefan Schweininger, Wiesbaden (DE);
Christian Wagner, Mainz (DE)

(73) Assignee: MHT Mold & Hotrunner Technology AG, Hochheim (DE)

( * ) Notice: Subject to any disclaimer, the term of this patent is extended or adjusted under 35 U.S.C. 154(b) by 0 days.

(21) Appl. No.: 12/223,565

(22) PCT Filed: Nov. 28, 2006

(86) PCT No.: PCT/EP2006/069004
§ 371 (c)(1),
(2), (4) Date: Feb. 9, 2009

(87) PCT Pub. No.: WO2007/087913
PCT Pub. Date: Aug. 9, 2007

(65) Prior Publication Data
US 2009/0162473 A1      Jun. 25, 2009

(30) Foreign Application Priority Data
Feb. 1, 2006   (DE) .......................... 10 2006 004 928

(51) Int. Cl.
*B29C 45/73* (2006.01)
(52) U.S. Cl. .................. 425/552; 264/328.16
(58) Field of Classification Search .................. 425/526, 425/547, 552; 264/328.16, 908
See application file for complete search history.

(56) References Cited

U.S. PATENT DOCUMENTS

| | | | |
|---|---|---|---|
| 4,017,242 A | 4/1977 | Mercer | |
| 5,599,567 A | 2/1997 | Gellert | |
| 5,607,702 A | 3/1997 | Havakawa et al. | |
| 5,930,882 A | 8/1999 | Gellert | |
| 6,444,159 B2 | 9/2002 | Petre | |
| 6,488,881 B2 * | 12/2002 | Gellert | 425/547 |
| 6,547,553 B2 | 4/2003 | Koch et al. | |
| 7,234,930 B2 | 6/2007 | Niewels et al. | |

FOREIGN PATENT DOCUMENTS

| | | |
|---|---|---|
| DE | 19642060 | 4/1997 |
| DE | 19908936 | 9/2000 |
| DE | 69618888 T | 6/2002 |
| WO | WO 2006/128275 | 12/2006 |

* cited by examiner

*Primary Examiner* — Jill L Heitbrink
(74) *Attorney, Agent, or Firm* — Michael L. Dunn

(57) ABSTRACT

A neck block of a molding tool for the production of a hollow body preform by means of injection molding, wherein the neck block has a main body with a shaping surface which is adapted to the external contour of a neck portion of the hollow body preform to be produced and is provided to come into contact in the injection molding operation with the neck portion of the hollow body preform, wherein furthermore there is provided at least one cooling passage for a cooling fluid which at least portion-wise extends substantially parallel to the shaping surface. The neck block is further provided with an inlet and an outlet and an inlet passage and an outlet passage which connect the inlet and the outlet respectively to the cooling passage. The cooling passage is arranged closer to the shaping surface than the inlet and the outlet. The cooling passage has at least one portion which extends substantially parallel to the shaping surface and which extends within the main body so that the walls thereof are formed by the main body, and a connecting portion which adjoins said portion and the walls of which are formed in part by the main body and in part by a closure element fitted onto the main body.

20 Claims, 10 Drawing Sheets

NECK BLOCK COOLING

BACKGROUND OF THE INVENTION

The present invention concerns a neck block of a moulding tool for the production of a hollow body preform by means of injection moulding, wherein the neck block has a main body with a shaping surface which is adapted to the external contour of a neck portion of the hollow body preform to be produced and is provided to come into contact in the injection moulding operation with the neck portion of the hollow body preform. In injection moulding the material is plasticised and then injected under high pressure into an injection moulding tool. The material remains in the tool until it goes into a solid condition in which it can be removed from the mould. For that purpose the injection moulding tool forms a substantially closed chamber, the contour of which corresponds to the intended external contour of the casting to be produced.

In the production of PET bottles, firstly suitable hollow body preforms are produced by means of injection moulding, which are only then blown to give the definitive bottle shape in a further method step. The hollow body preforms produced by means of injection moulding for PET bottles are also referred to as blanks. The preform to be produced in the injection moulding tool has a screw thread in the region of the subsequent bottleneck and generally a neck ring. Both the screw thread and also the neck ring form undercut configurations in the shaping tool so that the injection moulding tool must be of a multi-part structure at least in that region to permit the preform to be removed from the mould. The injection moulding tool portion forming the external contour of the bottle screw thread and the neck ring is generally of a two-part structure, wherein each of the two parts is referred to as a neck block and each part has a 180° peripheral portion of the screw thread.

In general it is desirable in regard to injection moulding for the corresponding wall thicknesses of the preforms to be reduced. Besides the saving on material and weight that has the additional advantage that the cycle time, that is to say the time over which the preform is disposed in the mould cavity of the tool in order to go into a condition in which the preform is removable from the tool without deformation phenomena is reduced. Preforms of smaller wall thickness more quickly adopt a condition in which they are stable in respect of shape.

In the meantime the development towards ever thinner wall thicknesses has progressed to such a degree that, in regard to preforms the region of the screw thread and the neck ring is of the greatest wall thickness and cooling of that region of the preform is the factor which determines the cycle time. Because of the formation of the screw thread, an increased waiting time is required until the plasticised material has everywhere gone into a removable condition, even in the region of the screw thread and the neck ring respectively.

To shorten the cycle times when injection moulding preforms, it is therefore already usual for two interconnected cooling bores to be introduced into the neck blocks, through which bores a cooling fluid, mostly water, is supplied and discharged. For that purpose the cooling bores are of a substantially V-shaped configuration. That is to say, firstly a blind cooling bore is formed in the injection moulding tool portion and then a second cooling bore with a bore axis which is inclined relative to the first bore axis is formed, wherein the two bores meet in the tool body so that cooling fluid can be introduced into the tool body through the one cooling bore and then flows through the first cooling bore into the second one and can again leave the tool body by way of the second cooling bore. In these structures however the cooling agent can only be introduced in highly point relationship. That results only in low levels of cooling efficiency in the neck blocks and also gives rise to irregular dissipation of heat. Furthermore non-homogenous cooling of the preform also gives rise to problems in regard to stability in respect of shape of the preform itself.

Accordingly, additional bores are already formed individually in the tool portion, the bores also terminating in the cooling bores or in the immediate proximity thereof, in which case what are referred to as cooling pins are fitted into those additional bores, the pins being made for example from silver and involving a thermal conductivity which is increased in relation to the material of the tool so that the heat can also be transported by way of the cooling pins to the cooling passage.

Apart from the fact that the provision of cooling pins leads to increased costs in manufacture of the injection moulding tool, the distribution of heat within the tool is also not optimum in those structures.

U.S. Pat. No. 5,930,882 discloses a cooling passage for a neck block, wherein the neck block is of a two-part nature. It has a radially outwardly disposed, machined portion and a radially inwardly disposed cast portion forming the shaping surface. In that arrangement, recesses are provided as cooling passages at the outer periphery of the cast portion, that is to say at its side remote from the shaping surface. They are sealed off in relation to the ambient atmosphere with the radially outwardly disposed portion of the neck block, while the feed and the discharge for the cooling fluid is also arranged in the radially outward portion of the neck block. In that case however it is found to suffer from the disadvantage that the radially inwardly disposed portion is in the form of a cast portion as, for the manufacture of neck blocks for different forms of preforms, a respective original or master mould is required for casting the cast portion. Casting moulds of that kind however are expensive to manufacture. In addition, the two-part nature of the main body of the neck block has a detrimental effect on the stability of the neck block. Fractures along the connection between the radially inwardly and the radially outwardly disposed portions are probable.

BRIEF DESCRIPTION OF THE INVENTION

Therefore, based on that state of the art, the object of the invention is to provide a neck block which is simple and therefore inexpensive to manufacture and which allows effective homogenous cooling in particular in the proximity of the shaping surface of the neck block.

According to the invention that object is attained in that the cooling passage has at least one portion which extends substantially parallel to the shaping surface and which extends within the main body so that the walls thereof are formed by the main body, and a connecting portion which adjoins said portion and the walls of which are formed in part by the main body and in part by a closure element fitted onto the main body.

In that way it is possible to form cooling passages which extend substantially along the entire shaping surface, while it is also possible to implement complex configurations for the cooling passage.

BRIEF DESCRIPTION OF THE DRAWINGS

Further advantages, features and possible uses of the present invention will be apparent from the description hereinafter of preferred embodiments and the accompanying Figures in which.

DETAILED DESCRIPTION OF THE INVENTION

Figure 1:
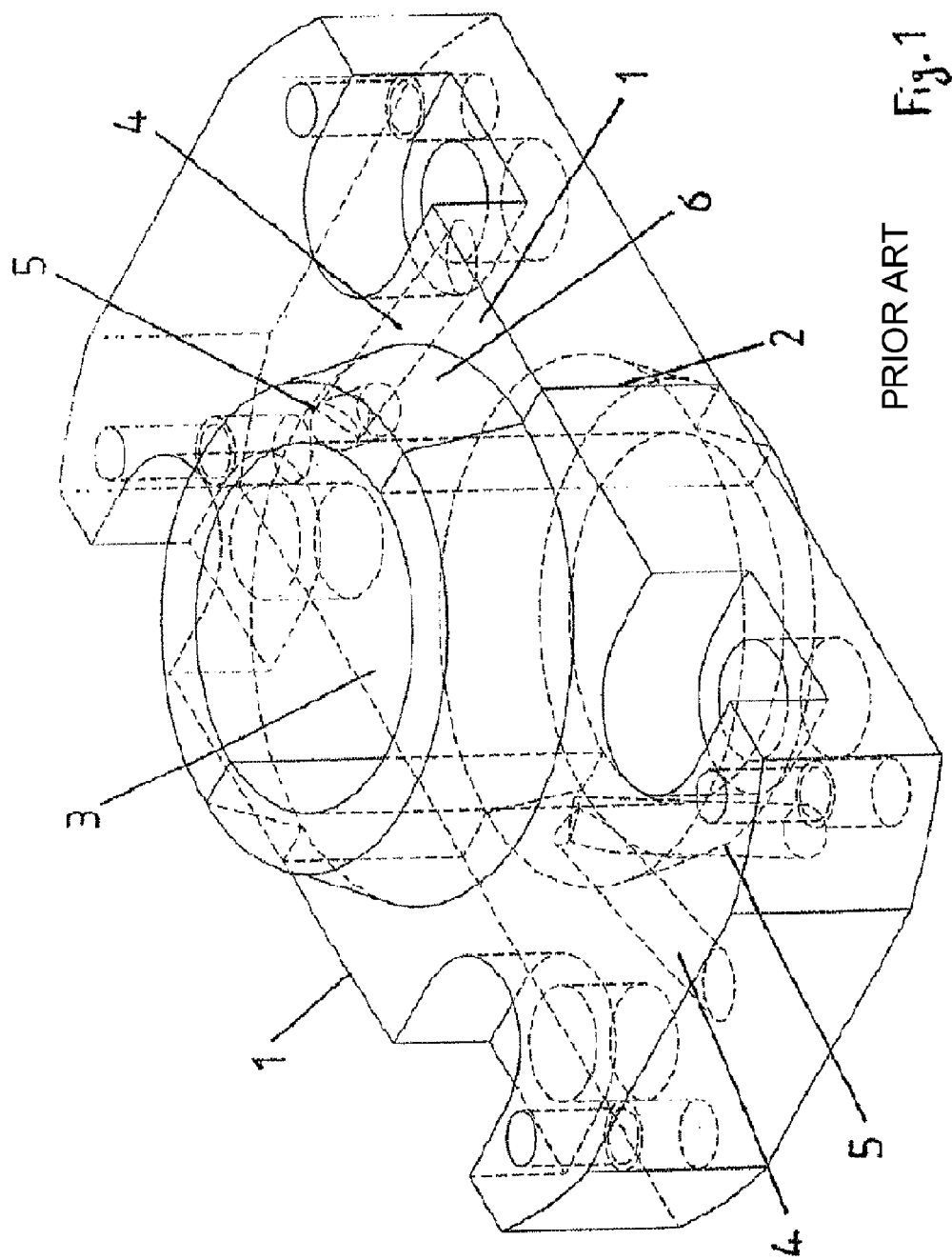
FIG. 1 shows a perspective view of an embodiment of a neck block according to the state of the art.

In more detail the invention is a neck block of a moulding tool for the production of a hollow body preform by means of injection moulding, wherein the neck block has a main body with a shaping surface which is adapted to the external contour of a neck portion of the hollow body preform to be produced and is provided to come into contact in the injection moulding operation with the neck portion of the hollow body preform, wherein furthermore there is provided at least one cooling passage for a cooling fluid which at least portion-wise extends substantially parallel to the shaping surface. The neck block is further provided with an inlet and an outlet and an inlet passage and an outlet passage which connect the inlet and the outlet respectively to the cooling passage. The cooling passage is arranged closer to the shaping surface than the inlet and the outlet. The cooling passage has at least one portion which extends substantially parallel to the shaping surface and which extends within the main body so that the walls thereof are formed by the main body, and a connecting portion which adjoins said portion and the walls of which are formed in part by the main body and in part by a closure element fitted onto the main body.

The combination of at least two mutually adjoining portions of the cooling passage, wherein one of those portions is recessed entirely out of the main body so that its walls are formed exclusively by the main body and the second connecting portion adjoining that first portion has walls which are formed in part by the main body and in part by a closure element fitted onto the main body means that it is possible to produce portions of the cooling passage, which are arranged in near-contour relationship, that is to say substantially in the proximity of the shaping surface, which portions are entirely within the integrally formed main body. In that case the walls of the portions of the cooling passage, which are entirely in the main body, are formed exclusively by the main body so that those portions do not weaken the stability of the main body. The portions which adjoin those portions and the walls of which are formed only in part by the main body make it possible to introduce the portions which are recessed completely in the main body, with one tool. Those portions are closed after manufacture by means of the fitted closure element.

The basic shapes of the shaping surface of the neck block are predetermined substantially by the rotational symmetry of the bottle neck of the preforms to be produced. Deviations from the pure cylindrical or frustoconical shape are afforded by the screw thread which, by virtue of its pitch, disrupts the total rotational symmetry. Accordingly the two neck blocks of a tool must be so designed that they reproduce the complementary halves of the screw thread in respect of their shape.

A substantially parallel configuration of the cooling passage with respect to the shaping surface in accordance with the sense of this application is such a configuration in which the cooling passage follows the contour of the shaping surface within the main body or approximates to the configuration of the shaping surface. In that respect for example successively arranged straight portions which are not colinear with each other can approximate the configuration in respect of shape of the shaping surface and a cooling passage formed in that way is substantially parallel to the shaping surface.

In that respect it is desirable if the shaping surface comprises portions which are substantially in the form of the periphery of a partial cylinder or the shape of the periphery of a partial truncated cone, wherein preferably the axes of the part-cylindrical portions and the axes of the part-frustoconical portions are disposed on an axis, referred to as the neck block axis.

A preferred embodiment of the invention is one in which at least in portion-wise manner the cooling passage has a branching so that at least two different flow paths are formed for the cooling fluid when flowing through the neck block from the inlet to the outlet. In that way it is possible to achieve a parallel flow through the various portions of the cooling passage, thereby achieving a very homogenous cooling action as many regions of the neck block are substantially simultaneously subjected to the action of cooling fluid at the initial temperature at which the fluid flows into the cooling passage. In addition that increases the amount of fluid flowing through the cooling passage and achieves redundancy in the event of blockage of a flow path.

A particularly preferred embodiment of the invention is one in which the cooling passage has a plurality of mutually adjoining substantially straight portions, wherein connecting locations are formed between two portions and wherein the passage axes of each two respective mutually adjoining portions are not arranged in mutually colinear relationship.

In that way, by means of a simple through-flow or blind bore, it is possible to produce a cooling passage which permits efficient and homogenous cooling of the whole of the shaping surface of the neck block. For that purpose the bores are produced in the main body at an angle relative to each other in such a way that each two respective mutually adjoining bores have intersecting regions forming the connecting locations between the individual portions. In that respect blind bores have the advantage that the initially closed ends of the bores, due to the intersection with the adjacent bore, already represent a fluid communication with respect thereto, the fluid communication being completely enclosed by walls of the main body. The open ends in the intersection region also form connecting locations for a fluid communication between the adjacent portions. However, to permit a flow of fluid from one portion to the next, the open ends of the blind bore must be closed by means of a closure element.

In that respect it is desirable if the passage axes of each two respective mutually adjoining portions include an angle of between 15° and 155°, preferably between 30° and 100° and particularly preferably between 40° and 70°.

It is also advantageous if at least a part of the portions of the cooling passage are arranged inclinedly with respect to the neck block axis. In that way it is possible for the contour of the shaping surface to be also followed in the axial direction of the neck block. Furthermore, the configuration of being inclined with respect to the neck block axis permits a further approach on the part of the cooling passage to the shaping surface, and thus affords more efficient cooling.

A preferred embodiment of the invention is one in which at least each second connecting location between mutually adjoining portions forms a connecting portion of the cooling passage, the passage wall of which is at least partly formed by the closure element.

A particularly preferred embodiment of the invention is one in which the cooling passage has a multiplicity of mutually adjoining portions, wherein each second one of the multiplicity of mutually adjoining portions is a horizontal portion arranged substantially perpendicularly to the neck block axis and a horizontal portion is always connected to a further horizontal portion by way of a vertical portion which is inclined at an angle of less than 60°, preferably between 30° and 45° and particularly preferably between 35° and 40° with respect to the neck block axis.

In that respect it is desirable if the passage walls of at least each fourth and preferably each second portion of the multiplicity of mutually adjoining portions is formed in part by the closure element. In that way it is possible to provide a cooling passage in which the cooling efficiency of the fluid is efficiently distributed in the axial direction over the main body of the neck block or over the shaping surface.

An advantageous embodiment of the invention is one in which the cooling passage has at least portion-wise alternately horizontal portions and vertical portions which are so arranged that the fluid is guided in a meander form at least portion-wise by the cooling passage.

A particularly preferred embodiment of the invention is one in which the cooling passage has precisely two horizontal portions and at least two, and preferably at least four, vertical portions which connect the horizontal portions and which are so arranged that the fluid entering the neck block through the inlet is passed to the first of the horizontal portions, from same by way of the at least two vertical portions to the second horizontal portion and further to the outlet passage and to the outlet. A cooling passage of such a configuration permits a parallel flow through the main body over the entire peripheral region of the shaping surface in almost the entire axial extent of the shaping surface.

In regard to the above-mentioned embodiments it is desirable if the vertical portions are produced in the main body of the neck block in the form of bores while the horizontal portions are provided in the form of milled recesses on the top side or underside of the main body so that they connect together the individual vertical portions in the proposed manner. To permit the fluid to be guided in the milled recesses at the top side or the underside of the main body the horizontal portions of the cooling passage are covered by means of one or more closure elements.

In a further particularly preferred embodiment of the invention the main body has a face which is remote from the shaping surface and which is of a conical configuration, wherein the conical face is provided to come into contact with another component of the injection moulding tool during the injection moulding operation.

Such a conical face on the side of the main body, that is remote from the shaping surface, permits the force exerted by the closing unit in the direction of the axis of the neck block to be diverted in a radial direction in order to press the oppositely disposed complementary neck block elements of an injection moulding mould together during the injection moulding operation and to seal off the tool mould.

The neck block is thus of a substantially T-shaped cross-section, wherein the shaping surface delimits the cross-bar of the T-shape and the leg of the T-shape is formed by a fixing portion extending from the shaping surface. In other words, the neck block has a portion of greater axial extent, which is formed by the conical faces and the shaping surface, and a fixing portion which approximately centrally adjoins same and which is of shorter axial extent.

To achieve an efficient and homogenous cooling effect it is particularly desirable if the cooling passage is arranged substantially in the portion of greater axial extent. The region of greater axial extent is most greatly heated by the shaping surface delimiting it. It is therefore desirable to provide a suitable cooling action in that region, preferably as close as possible to the shaping surface.

Furthermore arranging the cooling passage in the region between the shaping surface and the conical face permits cooling of the neck block over the entire axial extent of the shaping surface. In that fashion the bottle neck of the preform can be uniformly cooled so that non-homogeneities in the material of the preform are avoided.

In that respect it is advantageous if the conical face is formed by a separate cone portion which is in the form of a closure element. In that way, a cooling passage having portions, the walls of which are formed exclusively by the main body, can also be formed in the region between the shaping surface and the conical face. The portions which adjoin those portions of the cooling passage and which initially have open regions for manufacturing purposes can then be closed by means of the cone portion which is in the form of the closure element, thus providing a closed cooling passage.

Even it is advantageous to provide recesses in the formation of the cooling passage exclusively on the main body of the neck block, there are embodiments in which it is necessary or desirable for the closure element to have grooves or recesses for guiding the fluid.

In another particularly preferred embodiment the cooling passage has a curved portion, the walls of which are formed by the main body of neck block and only at one or both ends at least in part by the closure element. Particularly when those curved cooling passages are of an orientation which is substantially perpendicular to the axis of the neck block, those cooling passages can observe an equidistant spacing relative to the shaping surface so as to achieve a cooling effect which is substantially homogenous over the shaping surface, in the peripheral direction.

Such curved portions of the cooling passage, the walls of which are formed by the main body of the neck block and only at one or both ends at least in part by the closure element can preferably be produced by means of a spark erosion process. That involves using an erosion electrode which is mounted rotatably about an axis substantially coincident with the axis of the neck block and which is mounted to a tool holder in such a way that it can be introduced into the cooling passage to produce the curved cooling passage.

After manufacture, such a cooling passage has only one open end, through which the erosion electrode was introduced into the cooling passage. That end is closed by means of the closure element according to the invention. If the ends are further connected to the inlet and the outlet passages respectively, that affords a closed cooling passage which ideally follows the contour of the shaping surface.

It is desirable if the cooling passage has precisely two curved portions which are spaced from each other in the direction of the axis of the neck block and which are connected together at least one end with a connecting portion. In that case the walls of the connecting portion are at least in part formed by the closure element. Better distribution of the cooling action is achieved in that way in the direction of the axis of the neck block.

If for example the initially open ends of the cooling passages are disposed in mutually superposed relationship then by producing a groove substantially parallel to the axis of the neck block it is possible to provide a connecting portion between the two curved portions which are spaced in the direction of the axis of the neck block, that being finally closed off by means of the closure element. If now the two ends of the curved portions of the cooling passage, that are closed off by the main body of the neck block, are connected to the inlet and outlet passage respectively, that gives a closed passage from the inlet by way of the inlet passage to the first curved portion of the cooling passage and from there by way of the substantially vertical connecting portion to the second curved portion and through same to the outlet passage and to the outlet.

Alternatively, connecting portions provided with a closure element can be provided at both ends of the curved portions of cooling passage, in which case the inlet and outlet passages respectively between the two ends of the curved portions of the cooling passage are connected thereto so that the incoming flow of fluid is divided into two branches. The connecting portions which are substantially parallel to the axis of the neck block extend in the same flow direction.

By erosion of the passages, it is also possible to produce a cooling passage of any non-circular cross-section. That applies in particular to those portions of the cooling passage, the walls of which are formed entirely by the main body of the neck block. In comparison, the bored cooling passages from the state of the art are always of a circular cross-section. Thus, preferred embodiments of the neck block according to the invention have a cooling passage of square, rectangular, triangular and sickle-shaped cross-section. In particular it is desirable in that respect if the cross-section of the cooling passage is adapted to the shaping surface in such a way that the cooling passage has a surface region of the largest possible size, which extends substantially parallel to the shaping surface.

It is also possible for the curved portion of the cooling passage to be eroded from two ends.

In an alternative embodiment the curved portion of the cooling passage has two or more sections which extend over an angular portion of 90° or less, wherein the individual sections are connected together by further substantially straight portions.

It is also advantageous if the cooling passage is at a minimum spacing of less than 10 mm, preferably less than 5 mm and particularly preferably less than 3 mm from the shaping surface.

The object of the invention is also attained by an injection moulding mould for the production of hollow body preforms with at least one neck block having the above-specified advantages.

Furthermore the present invention provides a process for the production of a cooling passage in a neck block with a main body, wherein as described hereinbefore an at least partially curved portion of the cooling passage is recessed out of the main body by means of a spark erosion process, wherein the portion of the cooling passage has an opening at an end and the walls thereof are otherwise formed entirely by the main body.

FIG. 1 shows a neck block according to an embodiment in the state of the art. The broken lines in FIG. 1 are within the tool and cannot be viewed in a normal plan view onto the tool. They serve here to clearly show the internal configuration of the individual passages.

The illustrated tool has two neck blocks, wherein each has a main or tool body 1. The neck blocks shown in FIG. 1 can be pulled apart at the separation surface 2. The tool is of a substantially cylindrical internal contour which encloses a mould cavity 3. The neck blocks are part of an injection moulding tool. In the injection moulding process the plasticised plastic material is injected into the completely closed injection moulding tool portion and is caused to bear against the corresponding contours of the tool and solidifies. After solidification the injection moulding tool can be opened and the preform removed from the tool. At their top side and their underside the neck blocks respectively have a cone 6 which co-operates with other injection moulding tool portions which however are not shown here.

As already stated the moulding or in the case of the illustrated neck block the blank or preform must remain in the tool until the thermoplastic material has hardened. That is effected correspondingly more quickly, the more effectively the injection moulding tool portion is cooled. Basically rapid hardening of the preform is desirable as then the cycle time can be shortened and the tool is more quickly available for the production of a further preform.

For more rapid cooling in particular in the proximity of the internal contour which forms the mould cavity 3, it is already usual for two cooling bores 4 and 5 to be provided in the tool body 1. For cooling purposes the cooling fluid, generally cooling water, is introduced through the one cooling bore 4 and then passes out of the tool again by way of the other bore 5 by virtue of the communication between the two bores.

Figure 2:
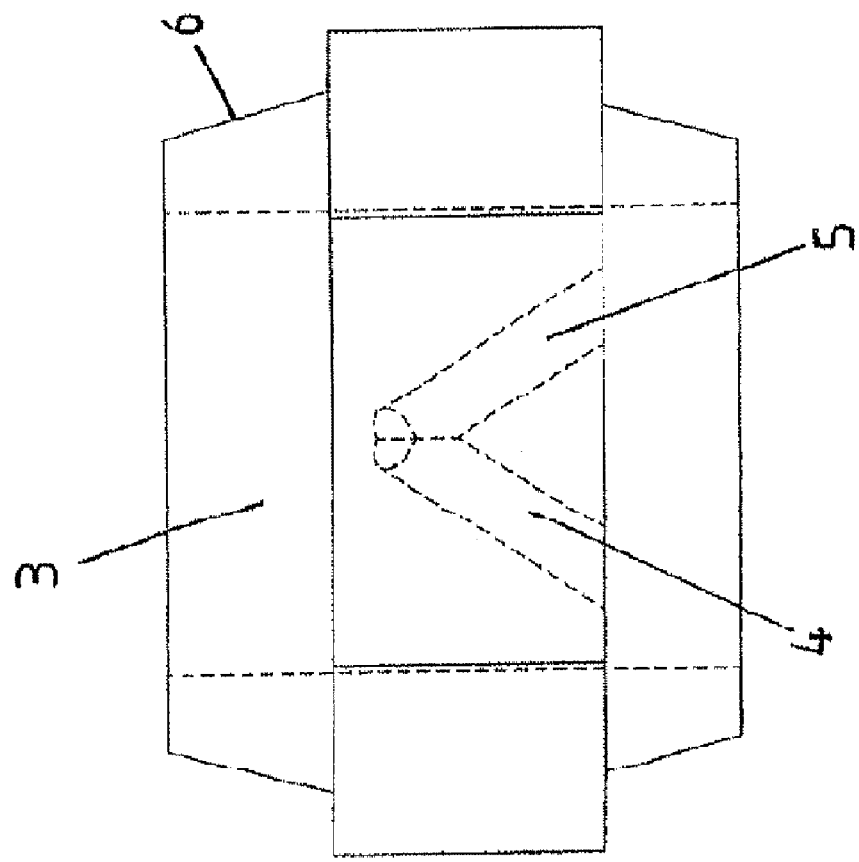
FIG. 2 shows a side view of the neck block of FIG. 1.

FIG. 2 shows a side view of the embodiment of FIG. 1, with the internal bores or passages again being shown in broken line. It is also possible to see here the conical connection 6 as well as the internal opening 3 in which the preform is arranged. The cooling bores 4 and 5 are arranged in a V-shape. For that purpose only two blind bores are formed in the tool portion so that the bore bottom terminates in the corresponding other bore. The two cooling bores are thus connected together within the tool body 1. It will be clearly seen that cooling occurs substantially only in point form, that is to say at the point at which the two cooling bores 4, 5 meet.

Figure 3:
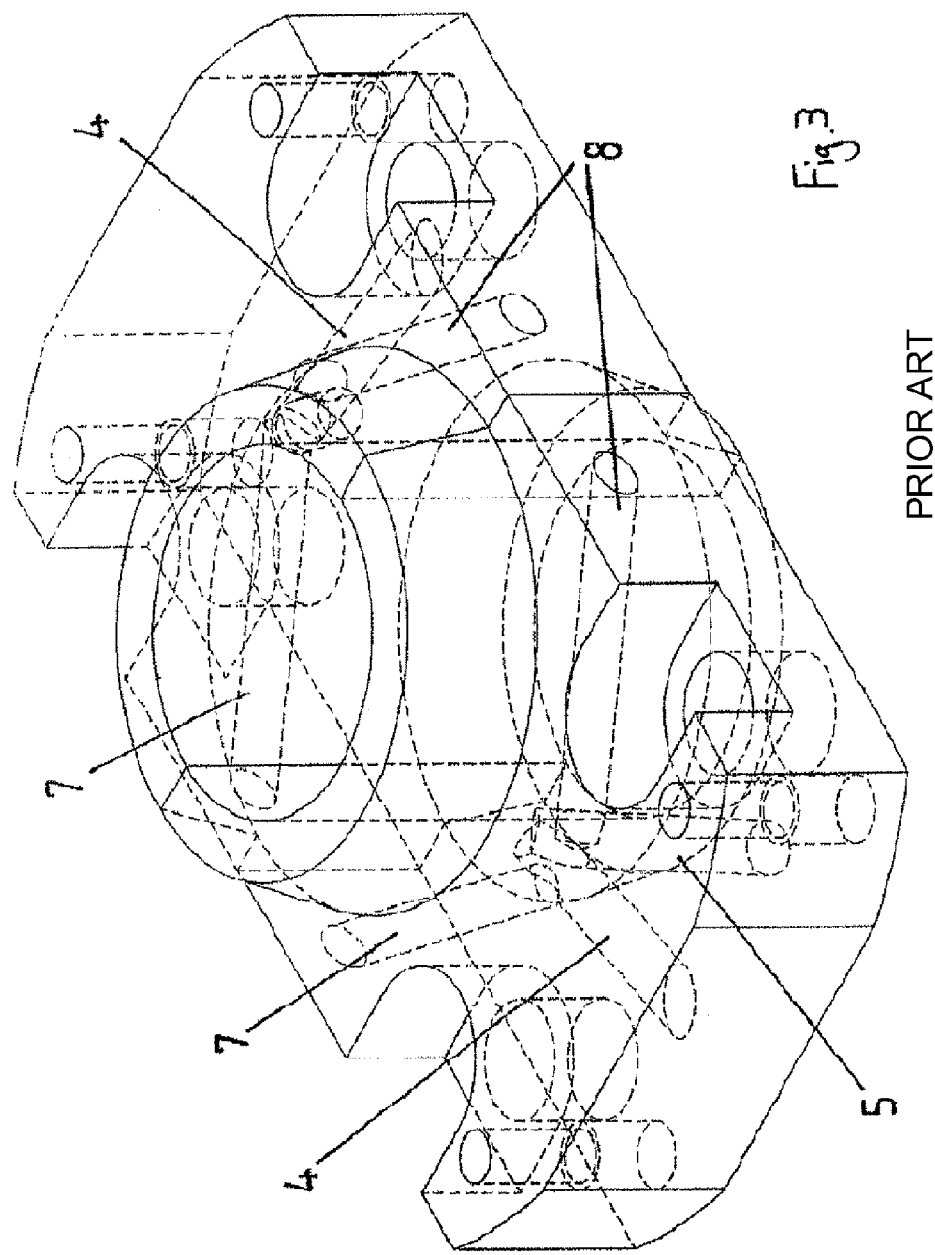
FIG. 3 shows a second embodiment of a neck block according to the state of the art.

FIG. 3 shows a further embodiment in the state of the art. This substantially corresponds to the structure shown in FIG. 1, this arrangement additionally having bores 7 and 8 which terminate in the proximity of or even within the two cooling bores 4 and 5. The additional bores 7, 8 are provided for receiving what are referred to as cooling pins. Those cooling pins are introduced into the bores 7, 8 and completely close them. The cooling pins are made from a material, the thermal conductivity of which is very much greater than that of the material from which the tool body 1 of the injection moulding tool portion is made. By way of example the cooling pins are made from pure silver. Improved cooling is achieved by the cooling pins of increased thermal conductivity, in the region of the internal contour which is subjected to the action of the hot plasticised material.

Figure 4:
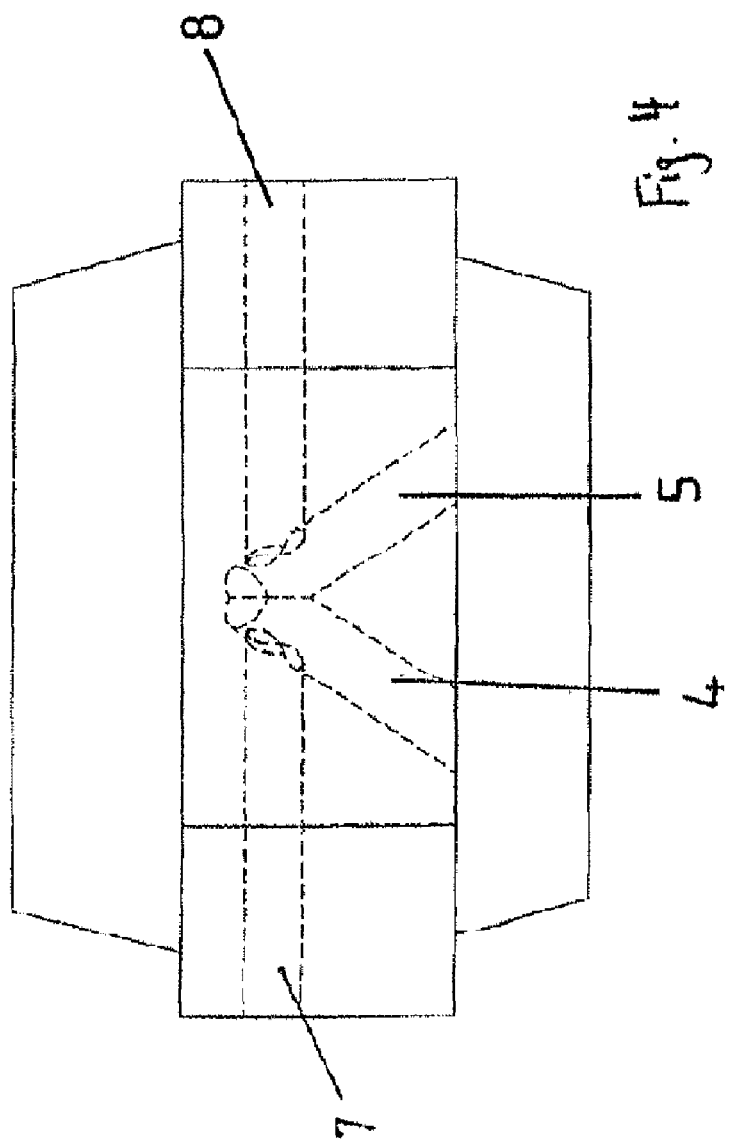
FIG. 4 shows a side view of the neck block of FIG. 3.

FIG. 4 shows a side view of the embodiment. It will be clearly seen that a V-shaped cooling passage is again formed by the cooling bores 4, 5. The cooling passage thus provides cooling in point form, which in this case is somewhat more uniformly distributed by means of the cooling pins of increased thermal conductivity.

Figure 5:
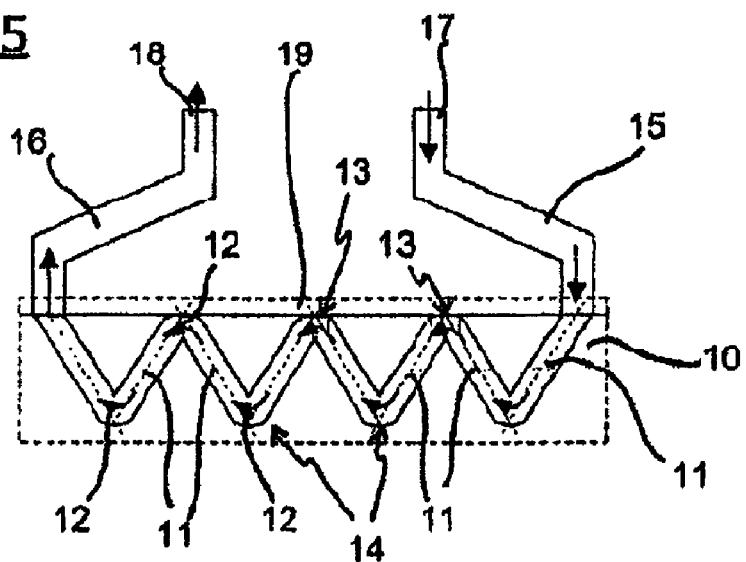
FIG. 5 shows a diagrammatic view of a first embodiment according to the invention of a neck block with cooling passage.

FIG. 5 is a diagrammatic view in section through a first embodiment of the neck block. Provided in the main or tool body 10 of the neck block which in the illustrated embodiment is made from tool steel are eight blind bores 11 which together form the cooling passage. The blind bores 11 are arranged in such a way that each two adjacent bores include an angle so that they intersect at their upper or lower end, thereby forming an interconnected passage. In that case the intersection regions of the individual blind bores form connecting locations 12 between the individual bores of the passage. The cooling passage formed by the blind bores 11 can be sub-divided into portions 13, 14, wherein the portions 14 are of such a configuration that they extend in the main body 10 and their walls are formed by the main body. The connecting portions 13 adjoining the portions 14 in contrast have at least one wall portion formed by a closure element which is fitted onto the main body 10, in the illustrated embodiment a closure plate 19. The two outwardly disposed blind bores 11 are connected to the inlet 17 and the outlet 18 by way of the inlet passage 15 and the outlet passage 16 respectively so that this affords a closed cooling passage from the inlet 17 to the outlet 18. In this respect the view in FIG. 5 is only diagrammatic in relation to the configuration of the inlet passage 15 and the outlet passage 16 respectively.

Figure 6:
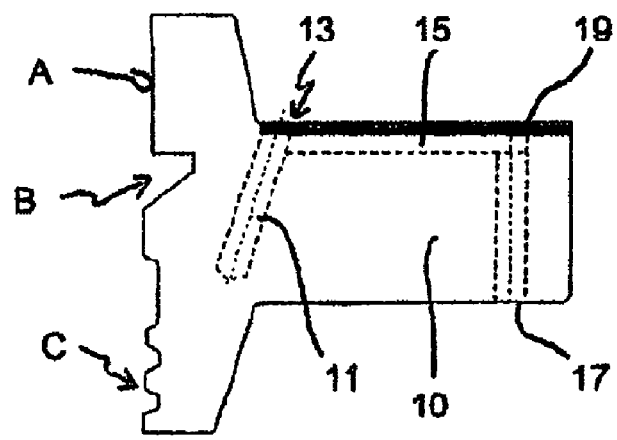
FIG. 6 shows a side view in section of the neck block according to the invention as shown in FIG. 5.

FIG. 6 shows a side view in section through a neck block with a cooling passage as shown in FIG. 5. The configuration of a blind bore 11 within the main body 10 can be clearly seen. The cooling passage, that is to say and therefore the bores 11, is inclined with respect to the axis of the neck block to permit the smallest possible spacing between the cooling passage and the shaping surface A of the neck block. The covering for the connecting portion 13 of the cooling passage by means of the closure plate 19 can also be clearly seen. In the illustrated embodiment the closure plate 19 serves both as a wall for the connecting portion 13 and also for the inlet and outlet passages 15 and 16 respectively.

FIG. 6 also clearly shows the structure of the mould. The shaping surface A has a recess B which forms the neck ring of the bottle and recesses C for shaping the screw thread.

In an alternative embodiment which is not shown here the blind bores 11 can be replaced by through bores so that at the underside of the main body 10 the cooling passage also has connecting portions which have to be closed by means of a closure plate.

Figure 7:
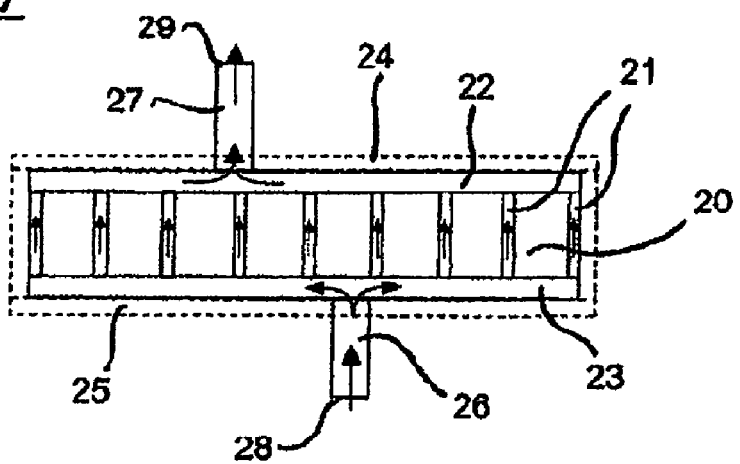
FIG. 7 shows a diagrammatic view of a second embodiment of the neck block according to the invention.

FIG. 7 shows an alternative embodiment of the cooling passage. In this case the cooling passage also has portions 21, the walls of which are formed completely by the main body 20 of the neck block while there are connecting portions 22, 23 which are also delimited by closure plates 24, 25. The cooling passage of FIG. 7 is of such a configuration that it has two horizontal portions 22, 23 which are arranged perpendicularly to the axis of the neck block and which are spaced from each other in the axial direction. In this case those horizontal portions 22, 23 are formed by milled recesses in the main body 20 of the neck block and are closed by means of the closure plates 24, 25 which are soldered onto the main body 20. The horizontal portions 22, 23 are connected together by a total of nine vertical portions 21. The inlet passage 26 connects the inlet 28 to the lower horizontal portion of the cooling passage while the outlet passage 27 connects the upper horizontal portion 22 to the outlet 29. In that way a fluid which flows into the cooling passage will flow through the vertical portions 21 substantially at the same time and in the same flow direction.

Figure 8:
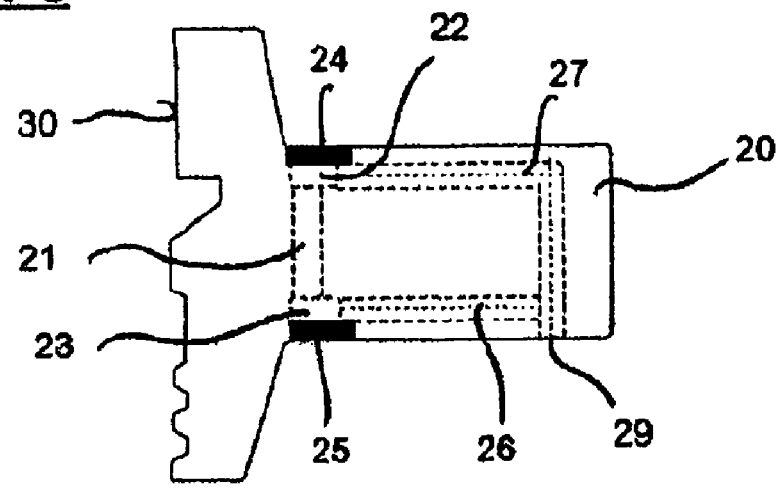
FIG. 8 shows a side view in section of the neck block of FIG. 7.

FIG. 8 shows a side view in section through the neck block according to the invention with a cooling passage, as is diagrammatically shown in FIG. 7. This illustrates in particular the arrangement of the vertical portions 21 and the horizontal portions 22, 23.

The closure plates 24, 25 are fitted into recesses in the main body 20 of the neck block. In that respect it is crucial that the closure plates 24, 25 terminate flush with the surface of the main body and are connected to the main body 20 in such a way that no solder projects beyond the line of the main body 20. For that purpose the recesses 32 in which the closure plates 24, 25 are received are of such a size that they can also receive all the solder after the soldering operation.

In the illustrated embodiment the solder is a spray solder which has a slightly higher flow temperature than the typical hardening temperature for the tool steel used for the main body. In that way the soldering process and the hardening process for the tool can be linked together, insofar as, upon hardening of the tool, it is firstly heated to the flow temperature of the solder so that the closure plates 24, 25 are joined to the main body 20 before the tool is cooled down to harden it at the intended hardening temperature.

Figure 9:
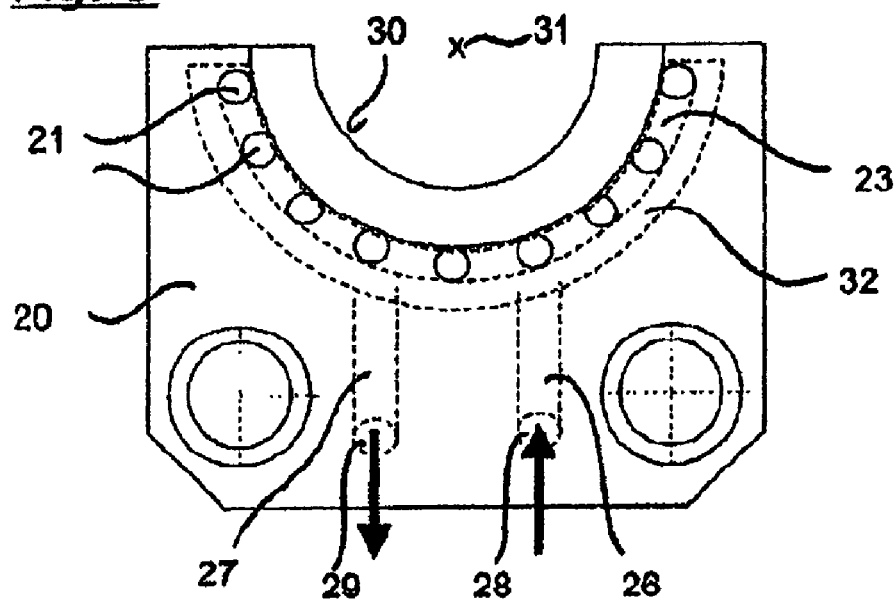
FIG. 9 shows a view from below of the neck block according to the invention of FIGS. 7 and 8.

FIG. 9 is a view from below of the neck block of FIGS. 7 and 8. The Figure clearly shows the bores arranged in a semicircular arrangement around the shaping surface 30 of the neck block and which form the vertical portions 21 which are parallel to the axis 30 of the neck block. The vertical portions 21 are connected to a horizontal portion 23 recessed out of the main body, wherein the horizontal portion 23 is shown in FIG. 9 without the closure plate 25 so that the recess 32 for receiving the closure plate 25 can be clearly seen in FIG. 9.

Figure 10:
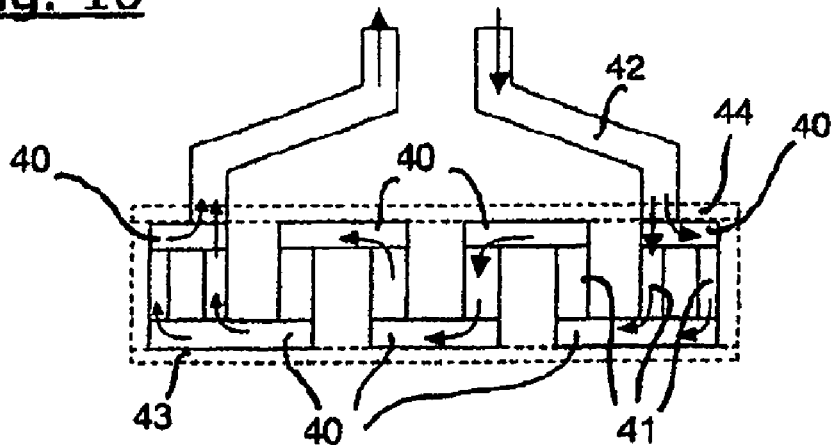
FIG. 10 shows a diagrammatic view of a third embodiment of the neck block according to the invention.

FIG. 10 shows a further alternative embodiment of the neck block according to the invention as a diagrammatic side view. In contrast to the embodiment of FIGS. 7, 8 and 9 the cooling passage in FIG. 10 has not just two but a total of seven horizontal portions 40 connected by vertical portions 41. In this case the vertical portions 41 are arranged between the horizontal portions 40 in such a way that the fluid flowing into the cooling passage through the inlet passage 42 is guided in a meander configuration by the mutually adjoining horizontal and vertical portions 40, 41. In the illustrated embodiment the horizontal portions 40 which form the connecting portions in the sense of the present invention are covered over by an upper and a lower closure plate 43, 44.

Figure 11:
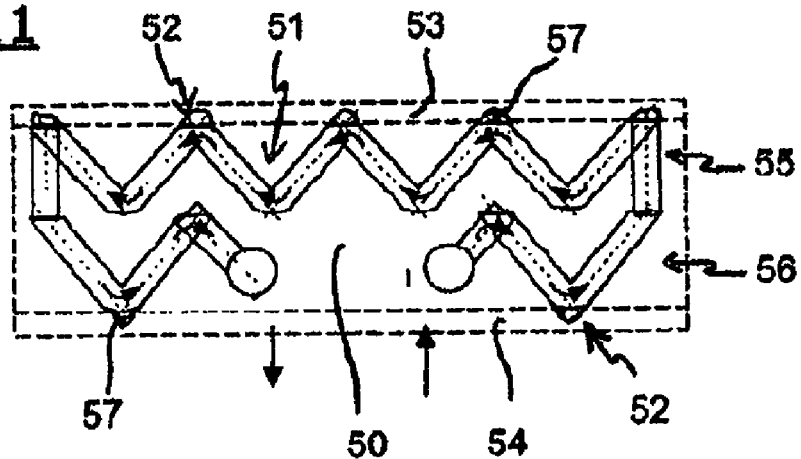
FIG. 11 shows a diagrammatic view of a further embodiment of the neck block according to the invention.

FIG. 11 shows a side view in section of an alternative embodiment of a neck block which is similar to the embodiment of FIGS. 5 and 6 in terms of the configuration of the individual portions of the cooling passage. In this embodiment also the cooling passage, by virtue of a suitable arrangement of blind bores, has portions whose walls are formed by the main body 50, as well as connecting portions 52 whose walls are formed both by the main body 50 and also by closure elements 53, 54. In this case, contrary to FIG. 5, the embodiment illustrated in FIG. 11 has two closure elements 53, 54 to delimit the connecting elements 52 of two portions 55, 56 of the cooling passage, which are spaced in the direction of the axis of the neck block. In this respect, in the illustrated embodiment, the closure elements 53, 54 have recesses 57 which are arranged in the region of the connecting portions and which in this region increase the free diameter of the cooling passage.

Figure 12:
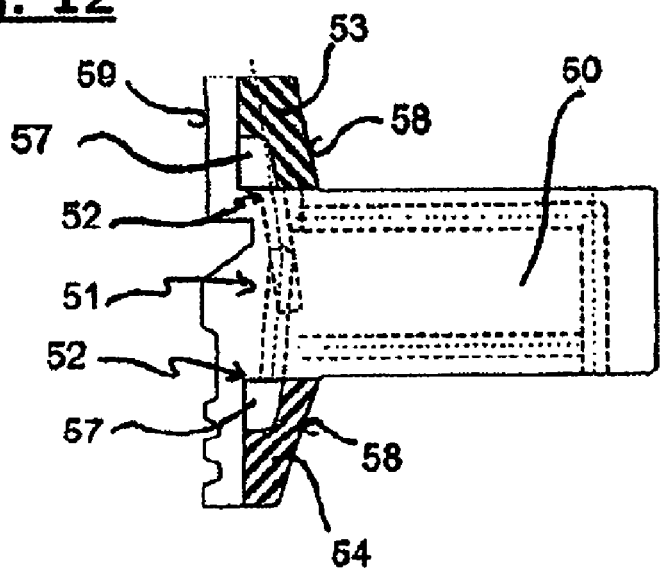
FIG. 12 shows a side view in section of the neck block of FIG. 11.

It will be seen from the side view in section through the neck block of FIG. 11, which is shown in FIG. 12, that the closure elements 53 and 54 are not formed by closure plates as in the above-discussed embodiments but by cone portions 53, 54 which are fitted onto the main body 50 of the neck block. In the state of the art those cone portions are in one piece with the main body 50 of the neck block and serve, by way of the conical faces 58, to convert the force exerted on the injection moulding mould in the direction of the neck block by the closing unit into a radial force component which is suitable for pressing the two neck blocks of an injection moulding mould together for a preform during the injection moulding operation. That configuration according to the invention of the cone portions makes it possible, as shown in FIG. 12, for the cooling passage with its portions 51, 52 to be arranged very close to the shaping surface 59 of the neck block. In this respect, in the FIG. 12 embodiment, the cooling passage is disposed in a region between the shaping surface 59 and the conical surface 58.

Figure 13:
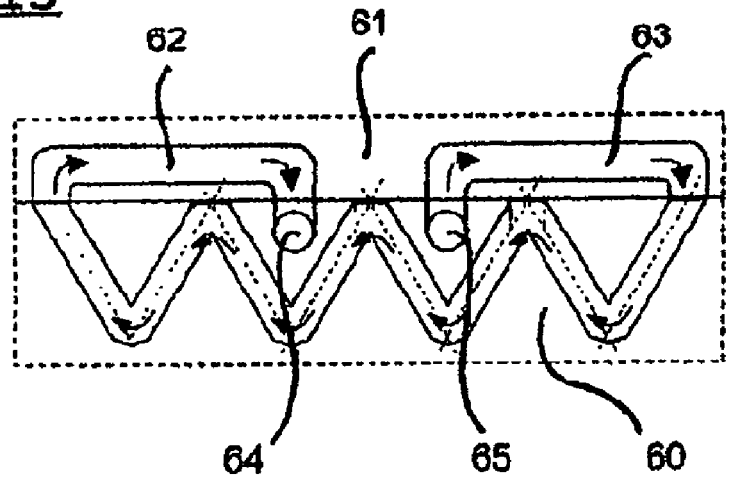
FIG. 13 shows a diagrammatic view of an alternative embodiment of the neck block according to the invention.
Figure 14:
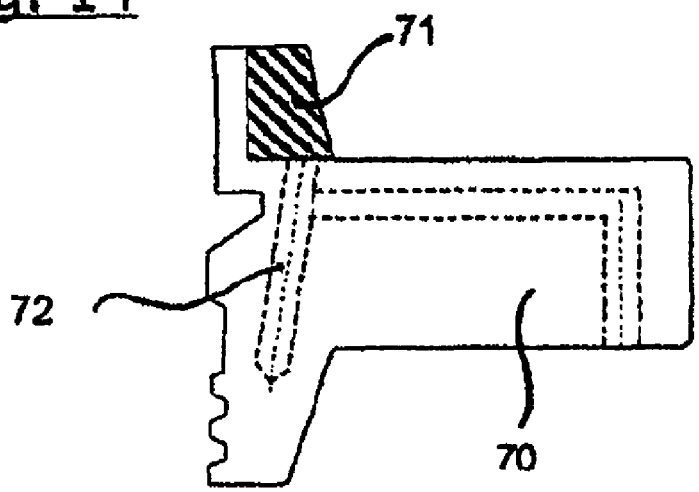
FIG. 14 shows a side view in section through an alternative embodiment of the neck block.

The embodiments shown in FIGS. 13 and 14 also have cone portions 1, 1 separate from the main bodies 60, 70 of the neck blocks. In this case the cone portion 1 in FIG. 13 is provided with additional passages 62, 63 which serve as inlet and outlet passage respectively and which connect the inlet 65 to the cooling passage and the cooling passage to the outlet 64 respectively. In comparison the cone portion 71 in FIG. 14 has no recesses or passages and serves only as a wall for the connecting regions of the cooling passage 72.

Figure 15:
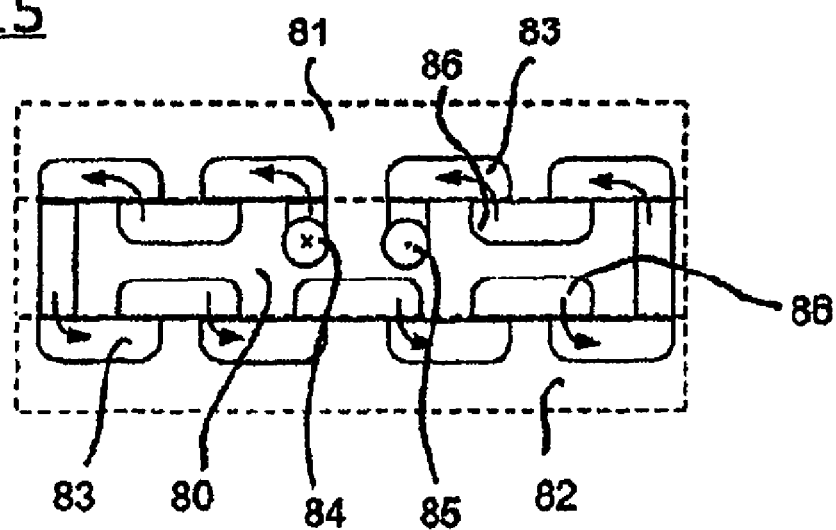
FIG. 15 shows a diagrammatic view of an embodiment of the neck block according to the invention.
Figure 16:
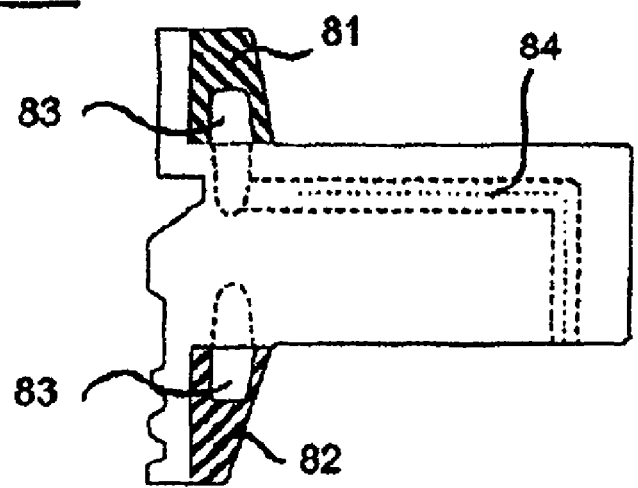
FIG. 16 shows a side view in section of the neck block of FIG. 15.
Figure 17:
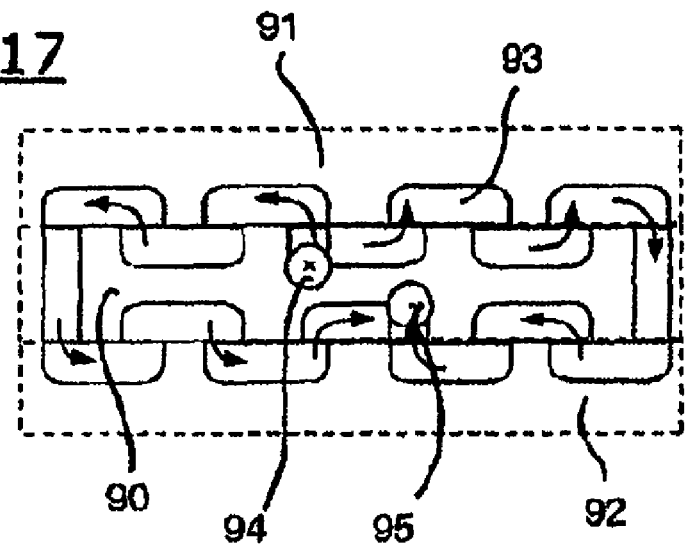
FIG. 17 shows a diagrammatic view of a further embodiment of the neck block according to the invention.

FIGS. 15 and 17 show diagrammatic views in section of embodiments of the neck block according to the invention with two respective closure elements 81, 82 and 91, 92 respectively which are in the form of separate cone portions. In this case the separate cone portions 81, 82 and 91, 92 have recesses 83 and 93 respectively serving to guide the fluid between the passage portions provided in the main body 80, 90 of the neck block. FIG. 16 shows a side view in section through a neck block as shown in FIG. 15.

The alternative embodiments of the neck block cooling system according to the invention, that are shown in FIGS. 15 and 17, differ from each other in respect of the differing arrangement of the inlet passages 84, 94 and outlet passages 85, 95. In FIG. 15 both the inlet passage and the outlet passage are connected to an upper portion of the cooling passage so that the individual portions of the cooling passage have the same flow of liquid flowing serially in succession therethrough. In comparison the inlet passage 94 and the outlet passage 95 in the FIG. 17 embodiment are so arranged that they are connected to the upper and the lower portions of the cooling passage respectively so that this provides a parallel through flow for a left-hand region and a right-hand region of the cooling passage. In that fashion the flow of fluid is branched by the cooling passage and this affords a "parallel" arrangement of the individual portions of the cooling passage.

Figure 18:
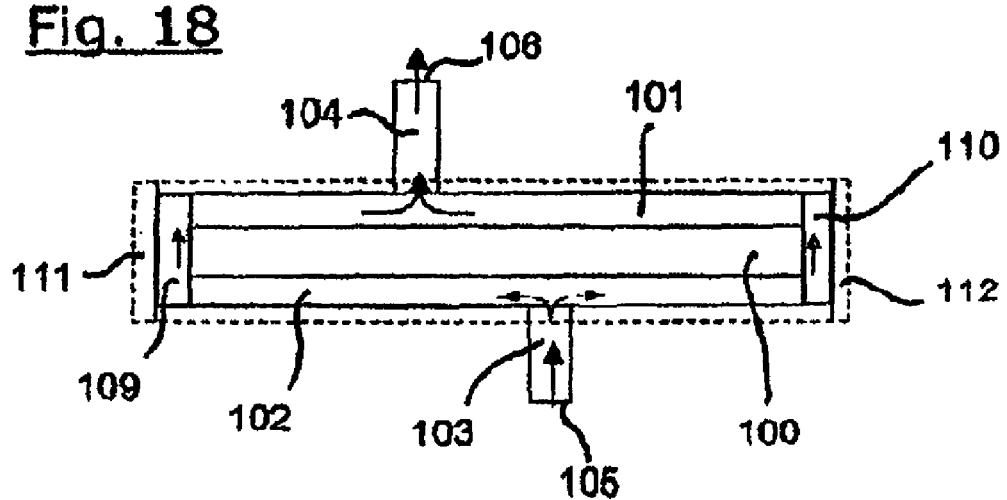
FIG. 18 shows a diagrammatic view of an alternative embodiment of the neck block according to the invention.
Figure 19:
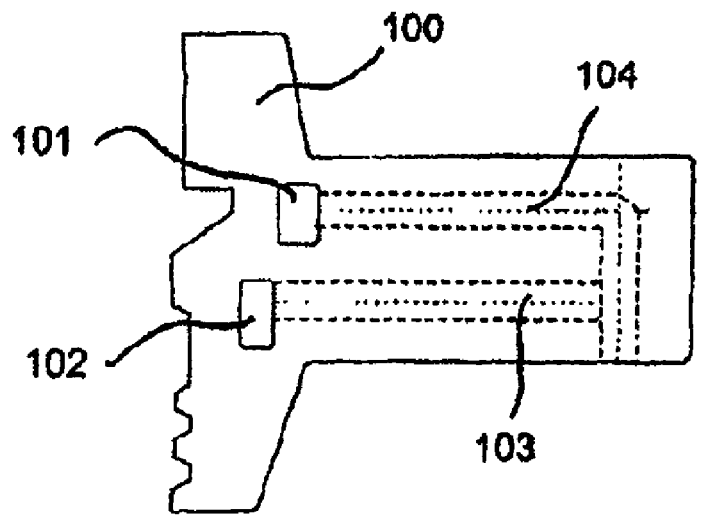
FIG. 19 shows a side view in section through the neck block according to the invention of FIG. 18.
Figure 20:
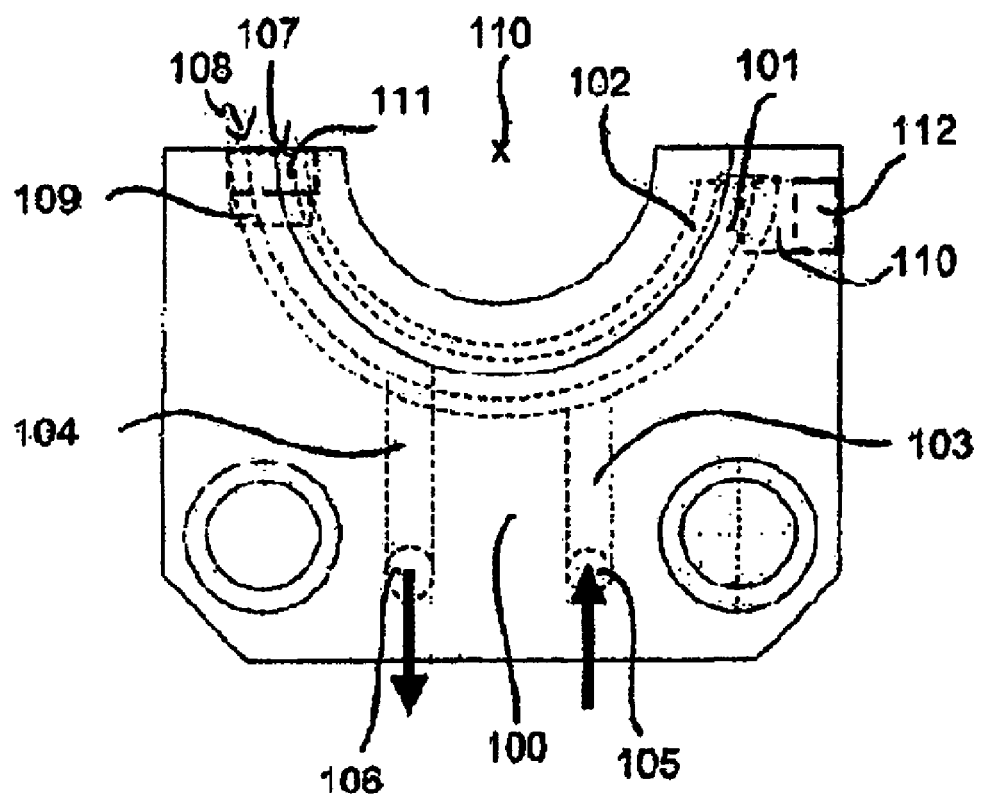
FIG. 20 shows a view from below of the neck block according to the invention of FIGS. 18 and 19.

FIGS. 18 to 20 show a further alternative embodiment of the invention which has curved horizontal portions 101, 102 of the cooling passage. As can be seen in particular from the view in FIG. 19 the walls of the horizontal portions 101, 102 of the cooling passage are formed exclusively by the main body 100 of the neck block. The curvature of the horizontal portions 101, 102 can be clearly seen from the view from below onto the neck block in FIG. 20. Those curved portions are recessed out of the main body 100 by means of spark erosion, from the end 107. That results in an open end 108 in respect of the horizontal portions 101, 102 of the cooling passage. Provided at that open end 108 is a recess 109 which forms a vertical portion of the cooling passage and which provides a fluid communication between the upper horizontal portion 101 and the lower horizontal portion 102. Such a vertical portion 110 is provided at the closed end of the horizontal portions 101, 102 so that here too there is a fluid communication between the upper portion 101 and the lower portion 102. The vertical portions 109, 110 are closed with closure elements 111, 112 so that a completely closed cooling passage is formed. The inlet passage 103 and the outlet passage 104 connect the inlet 105 to the lower horizontal portion 102 of the cooling passage and the upper horizontal portion 101 of the cooling passage to the outlet 106 so that this embodiment also involves a "parallel configuration" for the cooling passage.

Figure 21:
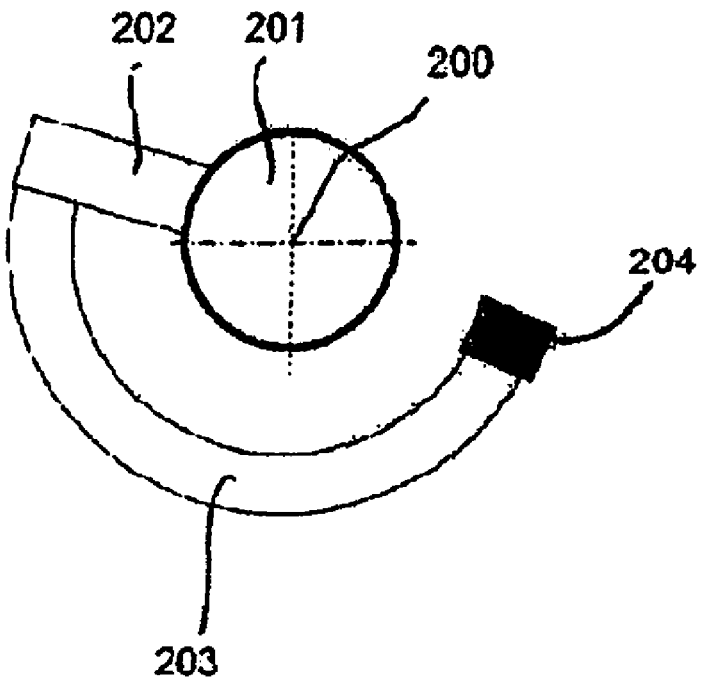
FIG. 21 shows a diagrammatic view of a tool for production of the neck block of FIGS. 18 to 20.

FIG. 21 shows the tool for spark erosion which makes it possible to recess the curved horizontal passages 101, 102 out of the main body 100 of the neck block. The tool is mounted rotatably about an axis 200, wherein fixed on the shaft 201 is a cantilever arm 202 which is of a length substantially corresponding to the spacing of the cooling passage, for example 101 from the axis 110 of the neck block. Fixed to the arm is a curved tool holder 203, the curvature of which corresponds to the curvature of the cooling passage so that the tool holder 203 can be introduced into the cooling passage when recessing same. Mounted to the front end of the tool holder 203 is a spark erosion tip 204 which produces the actual spark erosion effect and thus permits material removal in order to recess the cooling passage 101 out of the main body 100 of the neck block.

For the purposes of the original disclosure it is pointed out that all features as can be seen by a man skilled in the art from the present description, the drawings and the claims, even if they are described in specific terms only in connection with certain other features, can be combined both individually and also in any combinations with others of the features or groups of features disclosed herein insofar as that has not been expressly excluded or technical aspects make such combinations impossible or meaningless. A comprehensive explicit representation of all conceivable combinations of features is dispensed with here only for the sake of brevity and readability of the description.

LIST OF REFERENCE NUMBERS

1 tool body
2 separating surface
3 cavity
4 cooling bore
5 cooling bore
6 conical connection
7 additional bore
8 additional bore
10 main body
11 blind bore
12 connecting locations
13 connecting portion of the cooling passage
14 connecting portion of the cooling passage
15 inlet passage
16 outlet passage
17 inlet
18 outlet
19 closure plate A shaping surface
B neck ring
C screw thread
20 main body
21 vertical portion
22 horizontal portion
23 horizontal portion
24 closure plate
25 closure plate
26 inlet passage
27 outlet passage
28 inlet
29 outlet
30 shaping surface
32 recess
40 horizontal portions
41 vertical portions
42 inlet passage
43 closure plate
44 closure plate
50 main body
51 portion of the cooling passage
52 portion of the cooling passage
53 closure plate
54 closure plate
55 portion of the cooling passage
56 portion of the cooling passage
57 recesses
58 conical face
59 shaping surface of the neck block
60 main body
61 cone portion
62 additional passage
63 additional passage
64 outlet
65 inlet
70 main body
71 cone portion
72 cooling passage
80 main body
81 closure element
82 closure element
84 inlet passage
85 outlet passage
90 main body
94 inlet passage
95 outlet passage
100 main body
101 horizontal passage
102 horizontal passage
105 inlet
107 end
109 vertical portion
110 vertical portion
111 closure element
112 closure element
200 axis
202 arm
203 tool holder
204 spark erosion tip

The invention claimed is:

1. A neck block of a molding tool for the production of a hollow body preform by means of injection molding, wherein the neck block has a main body with a shaping surface which is adapted to the external contour of a neck portion of the hollow body preform to be produced and is provided to come into contact in the injection molding operation with the neck portion of the hollow body preform, wherein furthermore there are provided at least one cooling passage for a cooling fluid which at least portion-wise extend substantially parallel to the shaping surface, an inlet and an outlet and an inlet passage and an outlet passage which connect the inlet and the outlet respectively to the cooling passage, wherein the cooling passage is arranged closer to the shaping surface than the inlet and the outlet, where the cooling passage has at least one portion which extend substantially parallel to the shaping surface and which extends within the main body so that all of the walls of the portion which extends within the main body are formed by the main body, and a connecting portion which adjoins said portion and the walls of which are formed in part by the main body and in part by a closure element fitted onto the main body and a cross-section of the connecting portion walls are formed in part by the main body an in part by the closure element.

2. A neck block according to claim 1 wherein the shaping surface forms at least a portion of a negative shape of a screwthread.

3. A neck block according to claim 1 wherein the shaping surface comprises portions which are substantially in the form of a surface corresponding to the periphery of a partial cylinder or to the shape of the periphery of a partial truncated cone, wherein the axes of the part-cylindrical portions and the axes of the part-frustoconical portions are disposed on an axis, referred to as the neck block axis.

4. A neck block according to claim 1 wherein at least in part the cooling passage is branched so that at least two different flow paths are formed for the cooling fluid when flowing through the neck block from the inlet to the outlet.

5. A neck block according to claim 4 wherein the cooling passage has a plurality of mutually adjoining substantially straight portions, wherein connecting locations are formed between two portions and wherein the passage axes of each two respective mutually adjoining portions are not arranged in mutually co-linear relationship.

6. A neck block according to claim 5 wherein the passage axes of each two respective mutually adjoining portions include an angle between 30° and 100°.

7. A neck block according to claim 5 wherein the adjoining portions are arranged inclinedly with respect to the neck block axis.

8. A neck block according to claim 7 wherein at least each second connecting location between mutually adjoining portions forms a connecting portion of the cooling passage, the passage wall of which is at least partly formed by the closure element.

9. A neck block according to claim 5 wherein the cooling passage has a multiplicity of mutually adjoining portions, wherein each second one of the multiplicity of mutually adjoining portions is a horizontal portion arranged substantially perpendicularly to the neck block axis and a horizontal portion is always connected to a further horizontal portion by way of a vertical portion which is inclined at an angle of less than 60° with respect to the neck block axis.

10. A neck block according to claim 9 wherein the passage walls of at least each fourth and preferably each second portion of the multiplicity of mutually adjoining portions is formed in part by the closure element.

11. A neck block according to claim 9 wherein the cooling passage has at least portion-wise alternately horizontal portions and vertical portions which are so arranged that the fluid is guided in a meander form at least portion-wise by the cooling passage.

12. A neck block according to claim 9 wherein the cooling passage has precisely two horizontal portions and at least two vertical portions which connect the horizontal portions and which are so arranged that the fluid entering the neck block through the inlet is passed through the inlet passage to the first of the horizontal portions, from same by way of the at least two vertical portions to the second horizontal portion and further to the outlet passage and to the outlet.

13. A neck block according to claim 1 wherein the main body has a face which is remote from the shaping surface and which is of a conical configuration, wherein the conical face is provided to come into contact with another component of the injection molding tool during the injection molding operation.

14. A neck block according to claim 13 wherein the cooling passage is arranged substantially in a region of the main body between the shaping surface and the conical face.

15. A neck block according to claim 1 wherein the cooling passage has a curved portion, the walls of which are formed by the main body of neck block and only at one or both ends at least in part by the closure element.

16. A neck block according to claim 15 wherein the cooling passage has precisely two curved portions which are spaced in the direction of the axis of the neck block and which are connected together at least one end with a connecting portion, wherein the walls of at least one of the connecting portion are at least in part formed by the closure element.

17. A neck block according to claim 1 wherein the cooling passage is of a non-circular cross-section, preferably a rectangular, square, oval or sickle-shaped cross-section.

18. A neck block according to claim 1 wherein the closure element has grooves or recesses for guiding the fluid.

19. An injection molding mold for the production of hollow body preforms wherein it has at least one neck block according to claim 1.

20. A neck block of a molding tool for the production of a hollow body preform by means of injection molding, wherein the neck block has a main body with a shaping surface which is adapted to the external contour of a neck portion of the hollow body preform to be produced and is provided to come into contact in the injection molding operation with the neck portion of the hollow body preform, wherein furthermore there are provided at least one cooling passage for a cooling fluid which at least portion-wise extends substantially parallel to the shaping surface, an inlet and an outlet and an inlet passage and an outlet passage which connect the inlet and the outlet respectively to the cooling passage, wherein the cooling passage is arranged closer to the shaping surface than the inlet and the outlet, wherein the cooling passage has at least one portion which extends substantially parallel to the shaping surface and which extends within the main body so that all of the walls of the portion which extends within the main body are formed by the main body, and a connecting portion which adjoins said portion and the walls of which are formed in part by the main body and in part by a closure element fitted onto the main body, wherein the main body has a face which is remote from the shaping surface and which is of a conical configuration, wherein the conical face is provided to come into contact with another component of the injection molding tool during the injection molding operation wherein the conical face is formed by a separate cone portion which is in the form of a closure element.

* * * * *